United States Patent
White et al.

(10) Patent No.: US 10,714,839 B2
(45) Date of Patent: Jul. 14, 2020

(54) ACTIVE WIDEBAND ANTENNA

(71) Applicant: HRL Laboratories, LLC, Malibu, CA (US)

(72) Inventors: Carson R. White, Agoura Hills, CA (US); Hyok J. Song, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/554,274

(22) Filed: Aug. 28, 2019

(65) Prior Publication Data

US 2020/0099143 A1 Mar. 26, 2020

Related U.S. Application Data

(60) Provisional application No. 62/734,885, filed on Sep. 21, 2018.

(51) Int. Cl.
 *H04B 1/40* (2015.01)
 *H01Q 21/28* (2006.01)
 *H01Q 5/50* (2015.01)
 *H01Q 5/335* (2015.01)

(52) U.S. Cl.
 CPC .............. *H01Q 21/28* (2013.01); *H01Q 5/335* (2015.01); *H01Q 5/50* (2015.01)

(58) Field of Classification Search
 CPC ... H04B 1/04; H04B 1/16; H04B 1/18; H04B 1/40; H01Q 21/28; H01Q 5/335; H01Q 5/50
 See application file for complete search history.

(56) References Cited

U.S. PATENT DOCUMENTS

| 6,137,453 A | 10/2000 | Johnson | |
|---|---|---|---|
| 8,502,735 B1 * | 8/2013 | Moosbrugger | H01Q 3/30 343/700 MS |
| 8,754,817 B1 * | 6/2014 | Kuo | H01Q 1/243 343/700 MS |
| 9,077,066 B1 * | 7/2015 | Lee | H01Q 9/0407 |
| 2005/0012672 A1 | 1/2005 | Fisher | |

(Continued)

FOREIGN PATENT DOCUMENTS

| KR | 10-1083050 B1 | 11/2011 |
|---|---|---|
| KR | 10-1212219 B1 | 12/2012 |

OTHER PUBLICATIONS

U.S. Appl. No. 16/554,260, filed Aug. 28, 2019, White.

(Continued)

*Primary Examiner* — Andrew Wendell
(74) *Attorney, Agent, or Firm* — Ladas & Parry

(57) ABSTRACT

A wideband active antenna system comprising an antenna having N outputs and a nominal bandwidth, each of the N outputs being directly coupled to an associated buffer amplifier, with a distance between the N outputs and a first active stage of each associated buffer amplifier preferably being maintained as short as reasonably possible and preferably no greater than ¼ wavelength of any transmission and/or receiving frequency of the wideband active antenna system and/or preferably no greater than 0.1 wavelength of any transmission and/or receiving frequency in an extension band of frequencies lower than a lowest frequency in the nominal bandwidth of the antenna.

28 Claims, 11 Drawing Sheets

(56) References Cited

U.S. PATENT DOCUMENTS

| | | | |
|---|---|---|---|
| 2007/0293150 A1 | 12/2007 | Exal | |
| 2011/0261866 A1* | 10/2011 | Chang | H04B 1/40 |
| | | | 375/220 |
| 2012/0068912 A1 | 3/2012 | Bradley | |
| 2013/0063299 A1* | 3/2013 | Proudkii | G01S 7/024 |
| | | | 342/188 |
| 2013/0157713 A1* | 6/2013 | Stolarczyk | H04M 1/026 |
| | | | 455/550.1 |
| 2014/0210668 A1* | 7/2014 | Wang | H01Q 3/34 |
| | | | 342/372 |
| 2014/0327590 A1 | 11/2014 | Meharry | |
| 2015/0270620 A1 | 9/2015 | Inoue | |
| 2017/0338848 A1* | 11/2017 | Sharma | H04W 52/0235 |
| 2018/0062250 A1 | 3/2018 | Lavin | |
| 2018/0254562 A1 | 9/2018 | Dobric | |

OTHER PUBLICATIONS

Lee et al. "A low profile wide-band (5:1) dual-pol array," IEEE Antennas and Wireless Propagation Letters, vol. 2, 2003.
Lee, J. J., et al. "Wide band bunny-ear radiating element," *Proceedings of IEEE Antennas and Propagation Society International Symposium*, Ann Arbor, MI, USA, 1993, pp. 1604-1607, vol. 3.
https://www2.l3t.com/randtron/antenna_products/elements_dual_polarization_sinuous.htm (Printed: Nov. 27, 2019).
PCT International Search Report and Written Opinion from PCT/US2019/048906 dated Dec. 19, 2019.
PCT International Search Report and Written Opinion from PCT/US2019/048907 dated Dec. 19, 2019.

* cited by examiner

Top View

Cavity and Absorbers

Feed Region

Prior Art   Fig. 1(c)

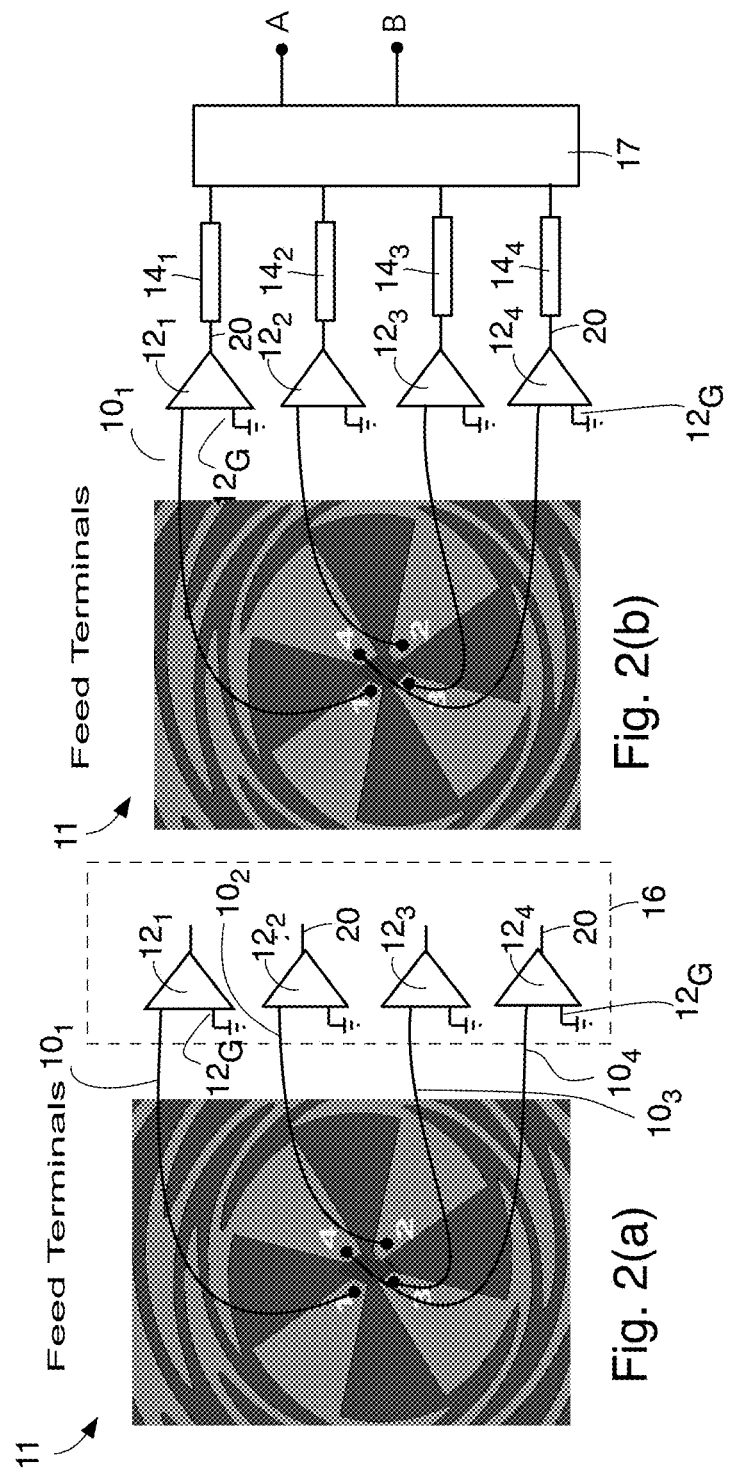

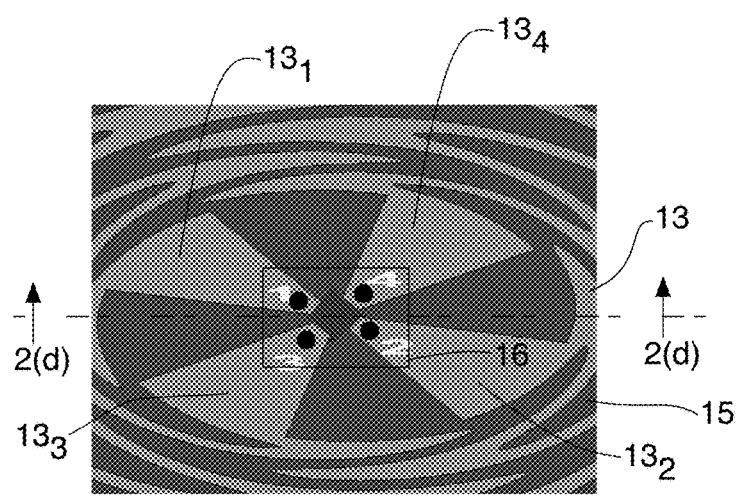
Fig. 2(c)
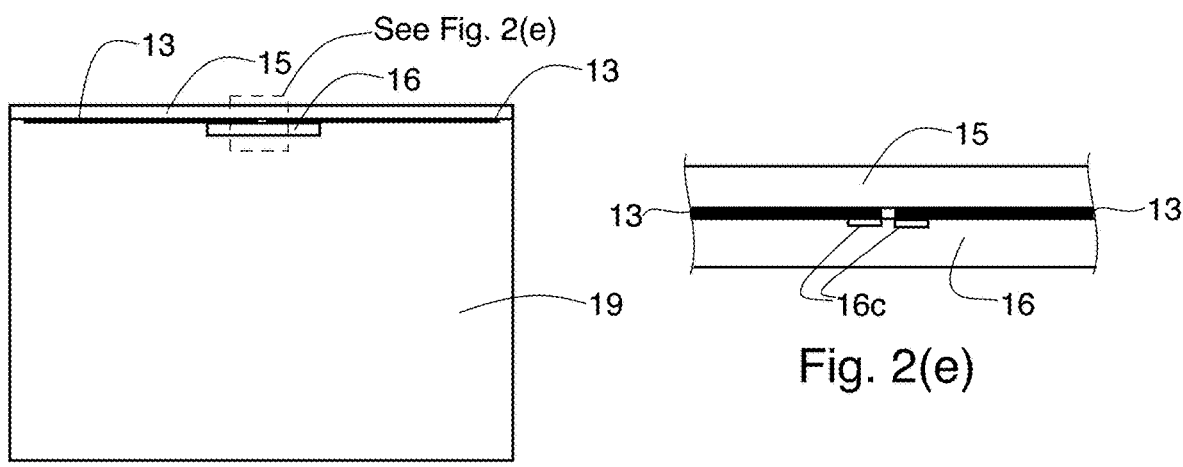
Fig. 2(d)
Fig. 2(e)

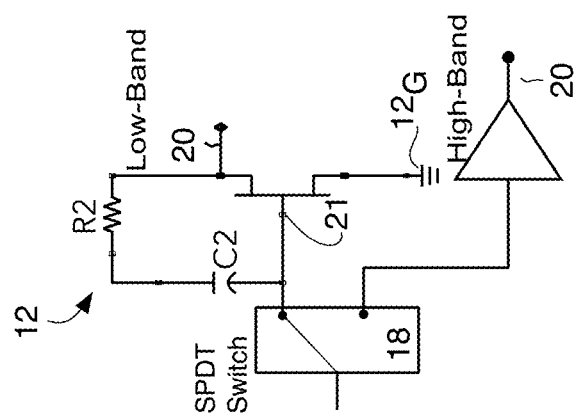
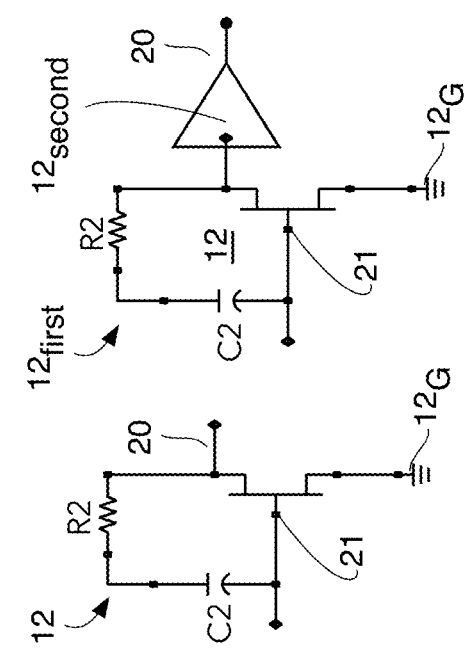
Fig. 3(a)  Fig. 3(b)  Fig. 3(c)

ACTIVE WIDEBAND ANTENNA

CROSS REFERENCE TO RELATED APPLICATIONS

This application claims the benefit of U.S. Provisional Patent Application Ser. No. 62/734,885 filed 21 Sep. 2018 and entitled "Active Wideband Antenna", the disclosure of which is hereby incorporated herein by reference.

This application is also related to U.S. Provisional Patent Application Ser. No. 62/734,881 filed 21 Sep. 2018 and entitled "Active Vivaldi Antenna", the disclosure of which is hereby incorporated herein by reference.

STATEMENT REGARDING FEDERALLY SPONSORED RESEARCH OR DEVELOPMENT

None.

TECHNICAL FIELD

Active wideband antennas.

BACKGROUND

Passive, cavity-backed, sinuous and log-periodic antennas typically have a ~10:1 bandwidth and require larger sizes to go to lower frequencies. These incorporate baluns and impedance matching networks to arrive to 50 Ohm terminal impedance for connection to coax cables. An existing product that is on the market today is sold, for example, by L3 Randtron of Menlo Park, Calif. The impedance match bandwidth may be extended to lower frequencies by adding loss, which rapidly degrades sensitivity.

Feedback LNAs are known in the art but are typically matched to 50 Ohms and are not integrated into these types of antennas. Rather, they are separated by a transmission line that requires a 50 Ohm match from the antenna to avoid standing waves and their associated ripple in the frequency response.

The presently disclosed technology relates to a wideband receive antenna that operates both in a "traditional band" of operation, where the size is $>=\frac{1}{2}$ wavelength ($\lambda$) at the minimum frequency in that band, and also in a low-frequency "extension band," where the antenna size is $<\lambda/2$. A boundary frequency fc is defined as that frequency which defines a boundary between the "traditional band" of operation and the "extension band" of operation. The presently disclosed antenna is a wideband antenna (preferably a cavity-backed sinuous antenna, but it also encompasses log-periodic and other types of antennas having N arms, N feed terminals, and an array of N buffer amplifiers integrated directly into or at the feedpoint of the antenna. N is greater than 1 and typical values of N may be 2 or 4, for example. Other values of N (>1) are also possible. "Directly into the feed or feedpoint" means that any transmission line used to connect the radiating arms of the antenna to a transistor input element of the buffer amplifiers (or example, the gate of a FET amplifier) is much shorter than a wavelength at any frequency in the extension band (preferably less than 0.1 wavelength at any frequency in the extension band) and also preferably less than ¼ wavelength at any frequency in the traditional band. The buffer amplifiers are preferably configured to possess high gain and a low noise figure when noise-matched to an antenna impedance Za (typically different than 50 Ohms). Za is chosen as the input impedance of the antenna arms in the traditional band. The buffer amplifiers are tied to a common ground node that is floating relative to the antenna arms. These buffers preferably comprise GaN FET transistors and are preferably implemented on a single semiconductor die or module. The buffer outputs are preferably impedance matched to an interface impedance (typically 50, 75 or 100 Ohms) and may be further coupled to either a combining network or to N receivers. As will be disclosed, the receive antenna may also be used as a transmit antenna, even though the present disclosure is primarily directed to its receive functionality.

A purpose of the presently disclosed technology is to make receive antennas have a wider bandwidth than is possible with state of the art antennas without increasing their size. Traditional wideband cavity-backed antennas operate over a 10:1 bandwidth and are between $0.5\lambda$ and $1\lambda$ in size at their operational minimum frequency. For example, an antenna operating from 2-18 GHz is ~2.4 inches or more in size. Increasing the bandwidth requirement to 0.5-18 GHz would mean increasing the size to ~10 inches (and would introduce additional design challenges to maintain the impedance match), or would force the user to accept severely degraded receive sensitivity (i.e. minimum detectable signal) over the 0.5-2 GHz extension band. This invention may allow operation over 0.5-18 GHz with a 2.4 inch size without severely degrading the sensitivity.

Prior art devices do not exist, to our knowledge, which anticipate this invention. Prior art antennas have been combined with Low Noise Amplifiers (LNAs), but that prior art does not achieve this bandwidth extension found with the present invention.

The presently disclosed technology addresses a long-felt need for wide bandwidth in a small antenna. In addition, this invention runs counter to textbook teaching on antenna and low-noise amplifier design.

BRIEF DESCRIPTION OF THE DISCLOSED TECHNOLOGY

In one aspect the presently disclosed technology provides a wideband active antenna system comprising an antenna having N outputs, each of the N outputs being directly coupled to an associated buffer amplifier, with a distance between the N balanced outputs and a first active stage of each associated buffer amplifier preferably being maintained as short as reasonably possible and preferably no greater than ¼ wavelength of any frequency the wideband of the antenna system.

In another aspect the invention provides a method for extending a useful frequency range of a passive antenna, the antenna having a plurality of arms which extend away from a central location, the method including: providing a chip with a plurality of buffer amplifiers embodied therein, each buffer amplifier having a signal input terminal, disposing the chip at said central location and arranging a layout of the buffer amplifiers embodied in said chip so that (i) the signal input terminal of each buffer amplifier in said chip is disposed immediately adjacent a proximate end of an associated one of said plurality of arms when said chip is disposed at said central location and (ii) the signal input terminal of each buffer amplifier in said chip is disposed immediately adjacent a control element of an active device of an associated one of said buffer amplifiers.

In another aspect the invention provides an apparatus for extending a useful frequency range of an otherwise passive antenna, the antenna having a plurality of arms which extend away from a central location, the apparatus including: a chip with a plurality of buffer amplifiers embodied therein, each buffer amplifier having a signal input terminal, the chip being disposed at said central location, and the chip having a layout of the buffer amplifiers embodied in said chip wherein (i) the signal input terminal of each buffer amplifier in said chip is disposed immediately adjacent a proximate end of an associated one of said plurality of arms of said antenna when said chip is disposed at said central location and (ii) the signal input terminal of each buffer amplifier in said chip is disposed immediately adjacent a control element of an active device of an associated one of said buffer amplifiers.

Preferably the presently disclosed technology permits a prior art, passive cavity-backed antenna designed to operate in some traditional band of operation (where the size of the receive or transmit elements are each $>=\frac{1}{2}$ wavelength ($\lambda$) at the minimum frequency in that band) to operate over a much wider bandwidth that includes a low-frequency "extension band," where the size of the receive or transmit elements are $<\frac{1}{2}$ wavelength ($\lambda$) at the minimum frequency that the antenna was otherwise designed to operate. A boundary frequency fc is defined as that frequency which defines a boundary between the "traditional band" of operation and the "extension band" of operation. The presently disclosed active antenna is a wideband antenna (preferably a cavity-backed, sinuous antenna, but it also encompasses log-periodic and other types of antennas having N arms, N feed terminals, and an array of N buffer amplifiers integrated directly into or at the feedpoint of the antenna, which permits an otherwise designed passive antenna to operate as an active antenna at lower frequencies than for which the passive antenna was designed.

While the presently disclosed technology can extend the bandwidth of a prior art passive antenna it is believed that it is can also be utilized to extend the bandwidth of future antenna designs of what would otherwise be a passive antenna having a comparatively narrower bandwidth.

BRIEF DESCRIPTION OF THE DRAWINGS

FIGS. 1(a)-1(c) depict a passive wideband cavity-backed antenna 11 according to the prior art and FIGS. 1(d) and 1(e) depict typical performance graphs therefor. Depicted here is a dual-polarization cavity-backed sinuous antenna 11, with FIG. 1(a) showing a top view thereof, FIG. 1(b) showing a perspective view and FIG. 1(c) showing the central portion of FIG. 1(a) in a close up view thereof and thus in greater detail. A similar antenna is made by Randtron Antenna System, of Menlo Park, Calif., with a part number 53640. Other examples of wide band antennas include cavity-backed dual polarization log-periodic and single-polarization sinuous, log periodic and other types of antennas. The perspective view of FIG. 1(b) shows the cavity filled with multiple absorber layers. These layers may each comprise a lossy dielectric and one or more of them may comprise a low loss dielectric such as air.

FIGS. 2(a) and 2(b) present schematic diagrams of an embodiment of the presently disclosed technology when used with a dual-polarization cavity-backed sinuous antenna 11 such as the antenna depicted by FIGS. 1(a)-1(c). FIGS. 2(a) and 2(b) depict the central feed region of cavity-backed antenna (see FIG. 1(c) for a representation of the feed region of the cavity-backed antenna of FIGS. 1(a)-1(c)), it being understood that the regions outside the feed region of the cavity-backed antenna—represented by FIGS. 1(a) and 1(b)—need not be modified in order to utilize the presently disclosed technology.

FIGS. 2(a) and 2(b) present a basic embodiment of the presently disclosed technology wherein an array of N buffer amplifiers is connected to N antenna terminals located at the proximate ends of the arms of an antenna.

FIG. 2(c) shows the antenna FIGS. 2(a) and 2(b) with a Integrated Circuit (IC) chip disposed on a top surface thereof.

FIG. 2(d) is a side elevational view through a slightly different embodiment the antenna of FIG. 2(c)—in this embodiment the IC chip is disposed under the top surface of the antenna as opposed to on the top surface as in the embodiment of FIG. 2(c).

FIG. 2(e) is an exploded view of a portion of the IC chip mounted to the underside of the top surface of the antenna.

FIG. 2(f) is a side elevational view while FIG. 2(f)-1 is an exploded view of a portion of FIG. 2(f) showing another embodiment where the IC chips are mounted near the underside of a top surface of the antenna on additional printed circuit boards each bearing a separate IC chip.

FIGS. 3(a)-3(d) present simplified schematics of the buffer amplifier circuits. FIG. 3(a) shows a basic buffer building block incorporating feedback. FIG. 3(b) shows a two-stage design providing higher gain and equalization over frequency and FIG. 3(c) shows a band-switched buffer where operation is divided into high and low bands. FIG. 3(d) shows an embodiment where a buffer amplifier may be used with an antenna capable of also being used as a transmit antenna.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph (f). In particular, the use of "step of" or "act of" in the claims herein is not intended to invoke the provisions of 35 U.S.C. 112, Paragraph (f).

Figure 1A:
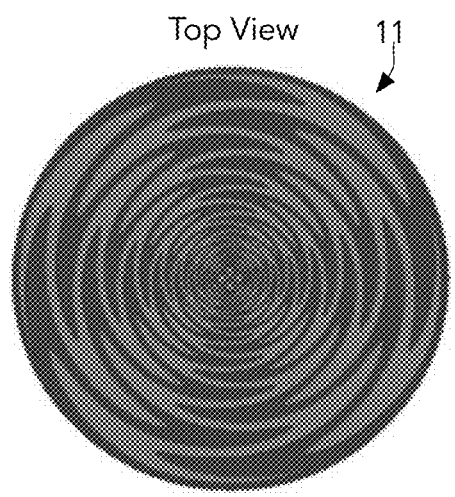
Figure 1B:
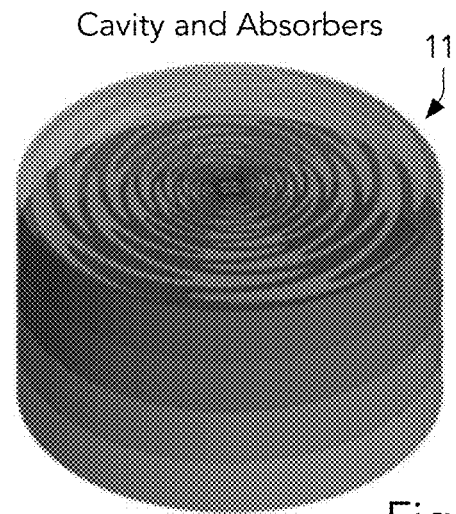

FIGS. 1(a)-1(c) show a cavity-backed wideband antenna according to the prior art. This implementation is a dual-polarization sinuous antenna. Four arms extend outward from the central feed point on a top layer of the antenna. When a first pair of opposing arms are fed differentially, the antenna radiates linear polarization. When a second pair of opposing arms are fed differentially, the antenna radiates linear polarization orthogonal to the radiation from the first pair of feeds. A variation of this antenna is the single polarization sinuous antenna (not shown), in which only two arms are present. The radiating layer sits atop a cavity that is loaded with absorptive material in order to provide a wideband termination to the downward traveling waves. A typical size of the antenna is 2.4 inches in diameter for operation over 2-18 GHz. The feedpoint is in the center of the radiating layer and comprises four terminals 1-4. A typical feed configuration is to feed the two opposing sets of feed terminals in a balanced manner (i.e. with baluns). An alternative configuration is to use alternative mode formers to generate dual circular polarization. This behavior is similar to other antennas, for example log-periodic antennas.

Figure 1D:
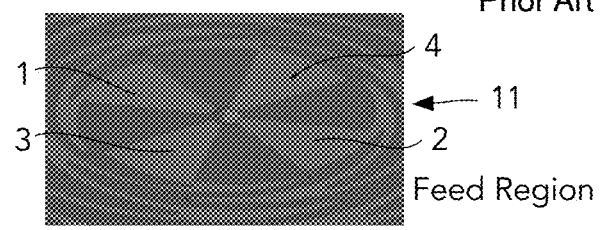
Figure 1D:
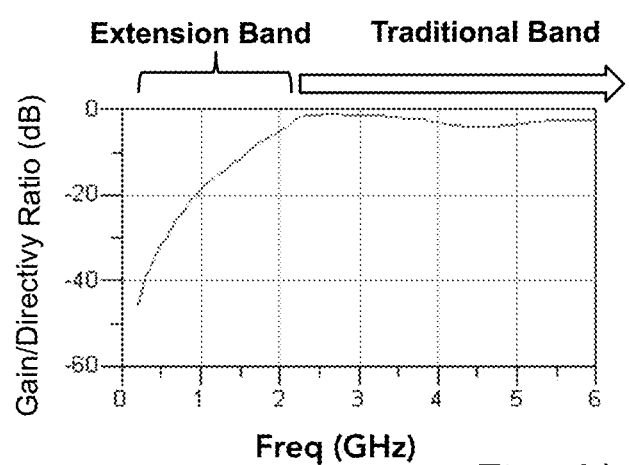
Figure 1E:
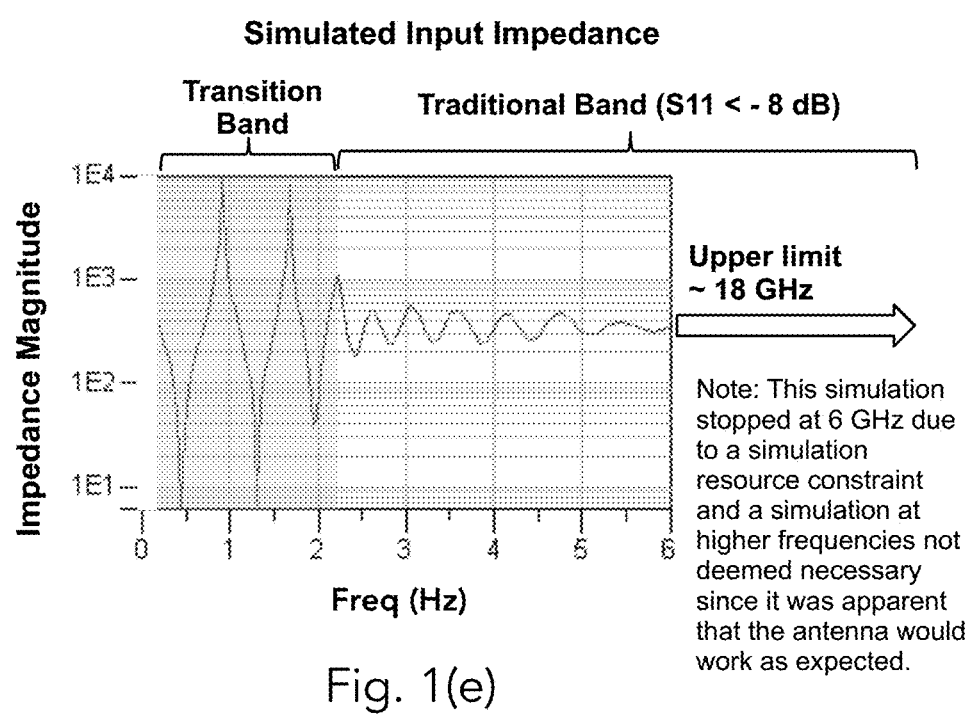

We simulated the performance of a single polarization of a dual polarization antenna with a balanced feed (i.e. a lumped port) spanning the gap between two opposite arms 13 (see FIG. 2(c)) of antenna 11. See FIGS. 1(d) and 1(e). This shows a good impedance match to 350 Ohms over 2.2-6 GHz; it is assumed that 6-18 GHz is also matched to 350 Ohms, but we did not simulate this because it does not help point out what is new in the embodiments disclosed herein. Below 2 GHz, the antenna efficiency (i.e. the ratio of gain to directivity) falls off rapidly. Note that the efficiency reduction is primarily due to impedance mismatch.

FIGS. 2(a) and 2(b) present a basic embodiment of the presently disclosed technology wherein an array of N buffer amplifiers is connected to N antenna terminals located at the proximate ends of the arms 13 of antenna 11. The buffer amplifiers 12 preferably share a common ground terminal $12_G$ that is floating with respect to the antenna 11. Each buffer amplifier 12 has an RF output port 20 that is preferably impedance matched to a reference or system impedance Z0. Building on the embodiment of FIG. 2(a), the N buffer amplifiers 12 may be further coupled to N transmission lines $14_{1-N}$ and then to a combining network 17 that combines the outputs to generate beams at ports A and B (e.g. horizontal and vertical or RHCP and LHCP) as is shown for the embodiment of FIG. 2(b) where N=4.

FIGS. 2(a)-2(e) are schematic views of one embodiment of the presently disclosed technology. The antenna 11 in these views is a dual-polarization, cavity-backed, sinuous antenna. Each of the feed terminals 1, 2, 3 & 4 are disposed at or adjacent the proximate ends of the arms 13 of antenna 11 and each is directly coupled (see transmission lines $10_1$-$10_4$) to a separate low noise buffer amplifier $12_1$-$12_4$. Note that there is no balun or other matching network between the four terminals 1, 2, 3 & 4 and the inputs (typically FET gates) of the four buffer amplifiers $12_1$-$12_4$. In this embodiment and the other disclosed embodiments, the transmission lines $10_1$-$10_4$ between the antenna terminals 1, 2, 3 & 4 and the buffers $12_1$-$12_4$ are made as short as possible by disposing one or more chips 16 containing the four buffer amplifiers $12_1$-$12_4$ immediately adjacent the proximate ends of arms 13 of antenna 11 which in turn may be supported by a substrate 15. See in particular FIGS. 2(c)-2(e) where a single chip 16 embodying four buffer amplifiers $12_1$-$12_4$ is directly coupled (and preferably bonded to) metallic arms 13 (individually labeled $13_1$-$13_4$ in some views) of the antenna 11 where they approach a center of the antenna 11. In other embodiments, chip 16 may be replaced with multiple chips 16. Moreover, the antenna terminals may be coupled to one or more chip(s) 16 via waveguiding structures that realize the modal impedances equal to Za, the impedance of the antenna in the traditional band, or to other circuit board bearing chips 16 (see the embodiment of FIGS. 2(f) and 2(g) discussed below). For example, for a single polarized antenna, its two terminals could be coupled to a balanced transmission line 14 with a characteristic impedance=Za. For a dual-polarization antenna, there are four transmission lines $14_1$-$14_4$ where the modes corresponding to the two linear polarizations have a characteristic impedance=Za~350 Ohms. The length of this guiding structure should preferably be minimized.

Figure 2F:
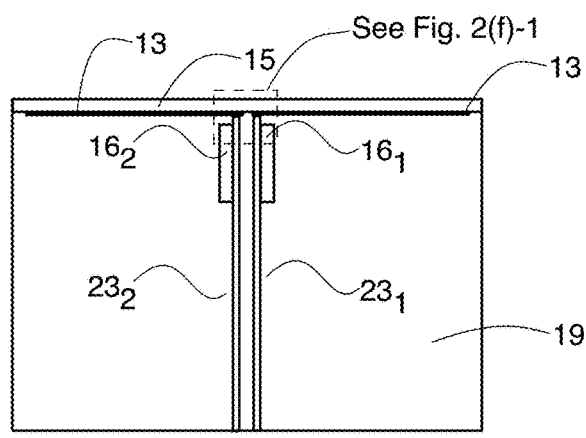
Figure 2G:
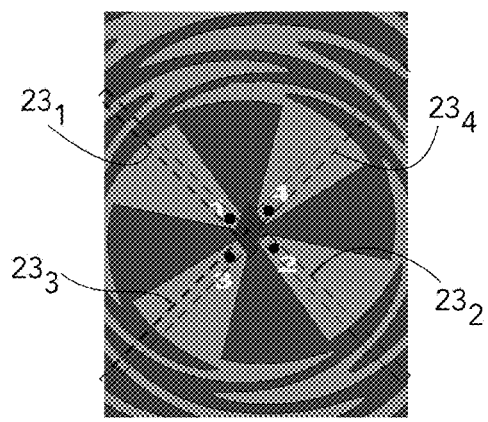
FIG. 2(g) is similar to FIG. 2(a) but the circuitry of the buffer amplifiers is omitted while the additional printed circuit boards, each bearing a separate IC chip (each embodying one of the buffer amplifiers of FIG. 2(a)), are shown with dashed lines.
Figures 1, 2F:
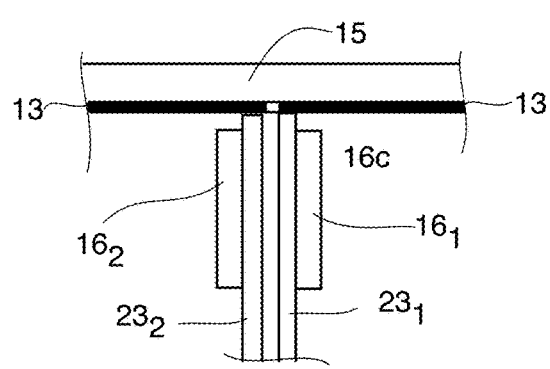
Figure 4:
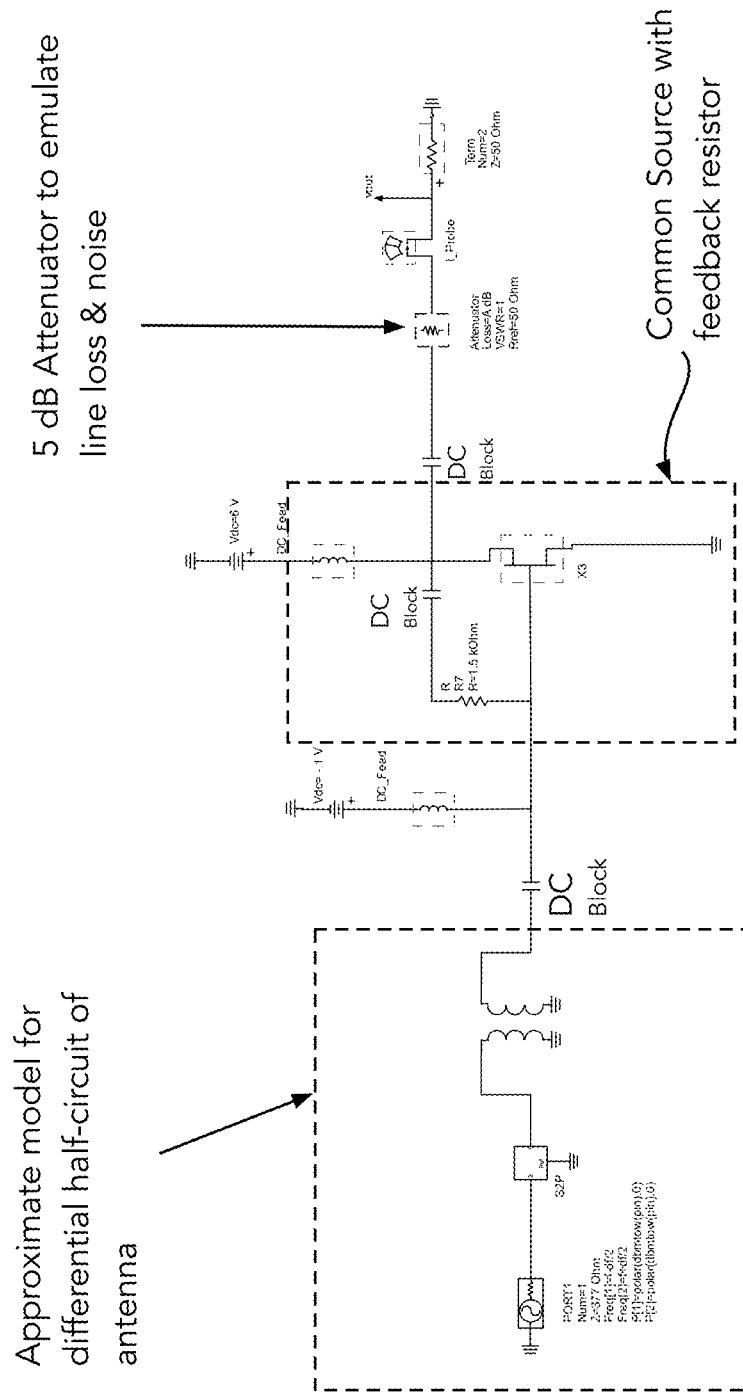
FIG. 4 depicts a model used to simulate the effect of the GaN buffer on the receive sensitivity. Full-wave simulations of the antenna were used to compose a 2-port S-parameter model for direct use in the circuit simulator.

FIGS. 2(f), 2(f)-1 and 2(g) depict an embodiment the cavity 19 of a cavity-backed antenna with cavity 18 wherein instead of bonding the chip 16 directly to the arms 13 of the antenna, each of the buffer amplifiers $12_1$-$12_N$ is embodied in a separate chip $16_1$-$16_N$. Each chip is preferably mounted of a separate printed circuit board $23_1$-$23_N$. Only two chips $16_1$ and $16_2$ and their corresponding circuit boards $23_1$ and $23_2$ are shown for clarity of representation in FIGS. 2(f) and 2(f)-1, while four circuit boards are shown in FIG. 2(g) (but the corresponding chips 16 are omitted from FIG. 2(g) for clarity of representation). The printed circuit board $23_1$-$23_N$ are preferably mounted at a right angle to a printed circuit board or other dielectric substrate 15 bearing arms 13 of the cavity-backed antenna 11 as is described in greater detail below. The printed circuit board $23_1$-$23_N$ may be disposed at right angles to a neighboring board 23 as is depicted by FIG. 4(g).

Figure 2H:
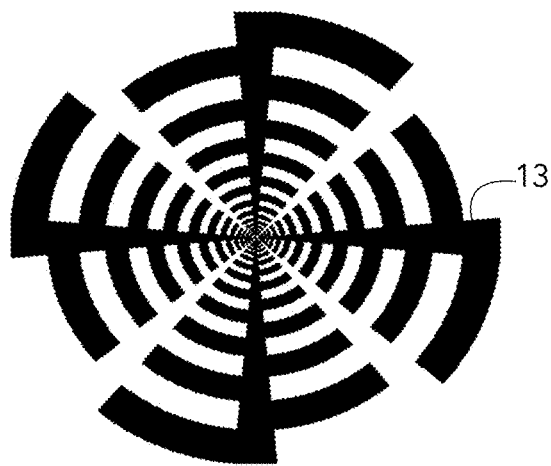
FIGS. 2(h) and 2(i) present schematic diagrams (similar to the embodiments of FIGS. 2(a) through 2(g)) of the presently disclosed technology when used with a log periodic, cavity-backed antenna.
Figure 2I:
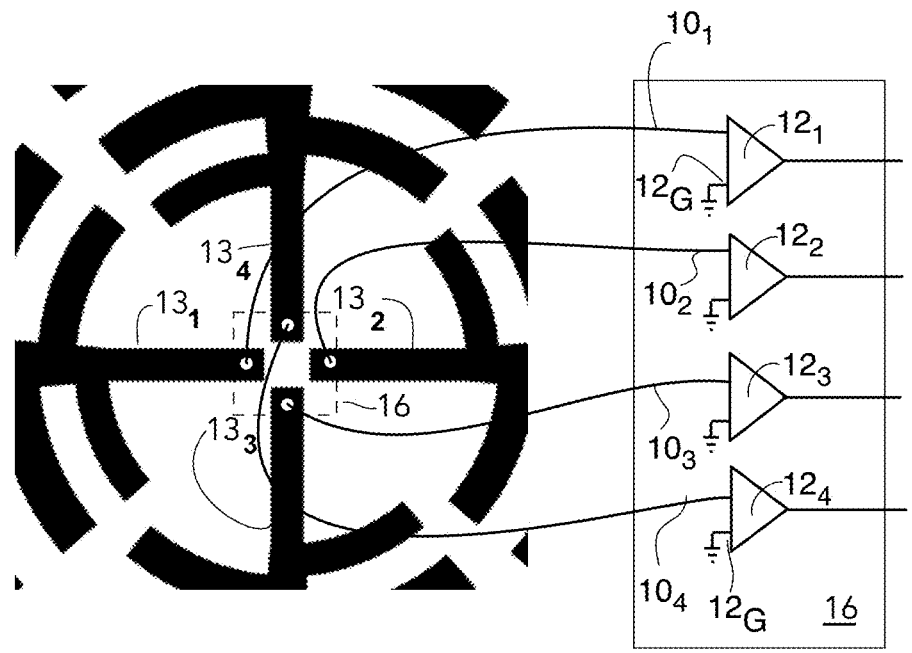

In FIGS. 2(h) and 2(i) a dual-polarization cavity-backed antenna is embodied instead as a log periodic antenna. The top metal arms 13 (which appear in black in these views) replaces sinuous pattern of FIGS. 2(a)-2(c) but the cavity backing structure shown in FIG. 1(b) is retained. As such a method of making the passive portion of antenna 11 of this embodiment would be essentially the same as FIGS. 1(a)-1(c). The difference between this embodiment and the prior art of FIGS. 1(a)-1(c) is the placement of a chip 16 (containing active elements, namely, buffer amplifiers $12_1$-$12_4$) directly on or immediately adjacent the antenna 11 thereby making the transmission lines $10_1$-$10_4$ as short as possible and thus much less than a quarter wavelength in length (the wavelength corresponding to a highest frequency at which the antenna is nominally operable). FIG. 2(*g*) depicts the details at the center of embodiment of antenna 11 of FIG. 2(*f*). Chip 16 is depicted both as a chip disposed at or near the proximate ends of arms 13 of the antenna along and schematically in terms of the buffer amplifiers In the embodiments of FIGS. 2(*a*)-2(*i*) four antenna terminals 1, 2, 3 & 4 are depicted for the antenna 11. But there may be more or fewer terminals in a given antenna embodiment. So conceptually, an array of N buffer amplifiers $12_1$-$12_N$ is connected to N antenna terminals 1-N where N=4 in embodiment of antenna 11 depicted by FIGS. 2(*a*)-2(*c*) and 2(*f*) and 2(*g*) and N may equal 2 in other embodiments. These N buffers $12_1$-$12_N$ share a common ground terminal $12_G$ (see also FIGS. 3(*a*)-3(*c*)) that is floating with respect to the antenna terminals 1-N. Each buffer 12 has an RF output port 20 that is preferably impedance matched to a reference impedance Z0. The outputs of the N buffers 12 may be further separately coupled to N transmission lines $14_1$-$14_N$ and then to a combining network 17 that combines the outputs to generate beams at ports A and B (preferably with, for example, horizontal and vertical polarization or RHCP and LHCP polarization).

The arms 13 of the cavity-backed antenna 11 may be defined by metal disposed on a printed circuit board or other dielectric substrate 15 as shown in FIGS. 2(*c*)-2(*g*), with an integrated circuit chip or chips 16 being disposed directly on the substrate 15 or on circuit board(s) 23 disposed adjacent (and preferably at right angles to) printed circuit board or other dielectric substrate 15, the integrated circuit chip(s) 16 having buffer amplifiers 12 that are preferably individually positioned on chip(s) 16 in order to make their connections (via transmission lines $10_1$-$10_N$) to arms 13 as short as reasonably possible. The chip 16 includes N buffers 12 (with FET amplifiers preferably as depicted by FIGS. 3(*a*)-3(*d*)) whereby contacts 16*c* (see also FIG. 2(*e*)) on the chip(s) 16 are bonded directly to the ends of the arms 13 of the cavity-backed antenna 11 (in some embodiments thereof) and thus the ends of the arms 13 are very closely arranged with respect to the amplifiers in buffers 12 so that the conductors (transmission lines $10_1$-$10_N$) between the ends of the arms 13 of the cavity-backed antenna 11 and the inputs (typically FET gates 21) to the buffer amplifiers 12 are preferably maintained as short as reasonably possible by forming the gates 21 of the FET buffer amplifiers immediately adjacent the aforementioned chip contacts 16*c*. The object here is to keep the physical distance between a gate 21 of a buffer amplifier and the proximate end of an associated arm 13 of antenna 11 as short as reasonably possible. If the FET amplifiers have more than one stage, then it is the gates of the first stage of each buffer amplifier which are preferably arranged next to the aforementioned contacts. The chip 16 is preferably disposed on a side of the substrate 15 which supports the antenna arms 13 and thus faces the cavity 19 (see FIG. 2(*e*)). Since the embodiments of FIGS. 2(*a*)-2(*c*) and 2(*g*) have four arms 13 (and hence N=4), then there are four buffer amplifiers 12 preferably embodied in a single chip 16. The cavity 19 is typically loaded with a carbon filled foam material.

In an embodiment with N buffer amplifiers (one for each of the N arms 13 of the antenna 11), each buffer amplifier has one RF output port 20, which is preferably impedance matched to a specified characteristic impedance Z0 (e.g. 50, 75 or 100 Ohms). N=4 in the preferred dual-polarization embodiment shown in FIGS. 2(*a*) and 2(*b*) and 2(*g*), but N=2 (a single polarized antenna 11) is also a desirable embodiment (see, for example, the embodiment of FIGS. 2(*h*) and 2(*i*)). The output ports 20 may then be connected to other components common in the art. In one embodiment, the N output ports 20 are coupled to N transmission lines $14_1$-$14_N$, which are then coupled to N RF connectors. In other embodiments, the output ports 20 are coupled to N receivers for a digital beamforming system. In another embodiment (see FIG. 2(*b*) for example), the N output ports 20 are coupled to N transmission lines $12_1$-$12_N$, which are then coupled to a combining or beamforming network 17. The N transmission lines $12_1$-$12_N$ are preferably amplitude matched and phase matched. This combining network 17 may comprise hybrid couplers, baluns, etc. to form output beams. In one example, outputs from transmission lines $14_1$ and $14_2$ are combined differentially, as are the outputs from transmission lines $14_3$ and $14_4$ to form outputs A and B, which are two orthogonal linear polarizations. Alternative combining networks, as are known in the art, can produce dual-circular polarization.

The N buffer amplifiers 12 preferably all reside on a single integrated circuit die or chip 16 and preferably comprise GaN FET transistors in order to maintain good amplitude and phase match between the buffers 12 and allow the buffer amplifiers 12 to be packed into small physical dimensions at or immediately adjacent the feedpoints at the proximate ends of arms 13 of the antenna 11 and to achieve the highest levels of linearity and power handling known today. Alternative embodiments may use other transistors in order to take advantage of known or future device technology developments. Furthermore, the buffers 12 may be integrated into a hybrid module in accordance with the preferred feed method (i.e. no transmission line), or may be integrated with the antenna separately (like a brick architecture for an array antenna).

Each buffer amplifier 12 may comprise a common-source amplifier. A preferred embodiment employs resistive feedback (see, for example, FIG. 3(*a*)), noting that the capacitor C2 is a DC blocking capacitor in this preferred embodiment preferably with impedance lower than that of the resistor R2 over the both the traditional and extension bands). Alternative embodiments employ both resistive and inductive feedback, no feedback, or output matching features. Output matching may or may not be aided by resistive attenuation. The first stage $12_{first}$ of the buffer 12 of FIG. 3(*b*) may be augmented by a second stage $12_{second}$, which may aid in tailoring the frequency response or increasing the gain of buffer 12 of that embodiment. Furthermore, the buffer amplifier 12 may be split into two bands (or more) using a single-pole double-throw (SPDT) or multiple throw (SPMT) switch 18 (see the embodiment of FIG. 3(*c*) for a SPDT embodiment). Since the embodiment of buffer amplifier 12 of FIG. 3(*c*) has two outputs 20, then N buffers (according to that embodiment) would either provide 2*N outputs or the two depicted outputs 20 in FIG. 3(*c*) could be combined with a second SPDT switch (not shown) in tandem with the first mentioned SPDT switch to provide a single output for the buffer of FIG. 3(*c*). The output match of the buffers 12 can be improved by adding attenuation (not shown) after the buffers 12. Due to the gain of the buffers, adding such attenuation has a minimal impact on the noise figure. Such attenuation is preferably less than 5 dB.

Figure 3D:
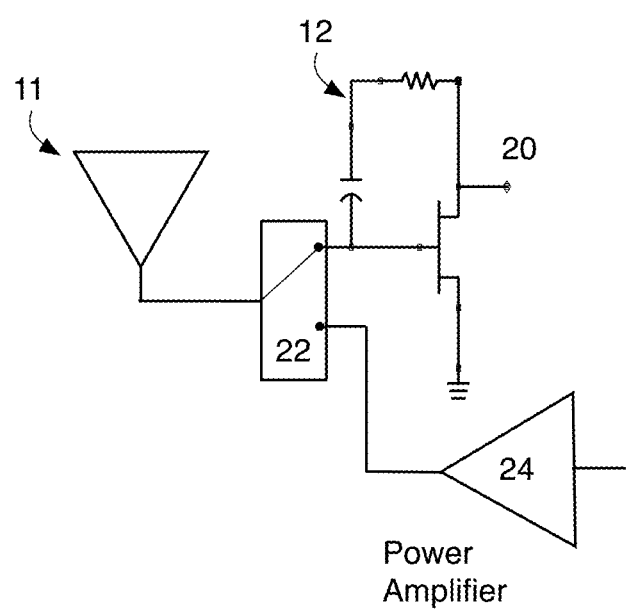

The antenna 11 may also be utilized, if desired, as a transmit antenna using a a single-pole double-throw (SPDT)

switch 22 to switch the antenna terminal to either a buffer amplifier 12 or to a power amplifier 24 of a transmitting device as depicted by FIG. 3(d). Without taking additional measures, the antenna 11 would perform well only in the traditional band as a transmitting antenna but would be useful in both the traditional band and the extended band as a receiving antenna by using a suitable switching arrangement (not shown).

Preliminary simulations of the invention have been completed using full-wave simulations of the cavity-backed sinuous antenna and non-linear models extracted for HRL T3 GaN transistor devices available from HRL Laboratories, LLC, of Malibu, Calif., having a size of, for example, 6×50 µm. These models do have a limitation in that they do not account for 1/f noise, which could limit the fidelity of the results at the lowest frequencies. The first step in the simulation was to convert the simulated radiation pattern and impedance of the radiator and to generate a 2-port model of the antenna (see FIG. 4). In this model, S21 is the total antenna efficiency (including impedance match and radiation efficiency), and S22 is the passive antenna reflection coefficient. S21 and the noise figure were evaluated both with and without a buffer. In order to evaluate the impact on the sensitivity, a 5 dB attenuator was inserted to account for receiver noise. The input third-order intercept point (IIP3) was also simulated using harmonic balance. The reference plane is the incident wave. In this simulation, the model for one of the two polarizations was converted to its differential half circuit. Therefore, this model applies to a linear polarization formed by combining the outputs of arms 1 and 2 or 3 and 4 differentially.

Figure 5:
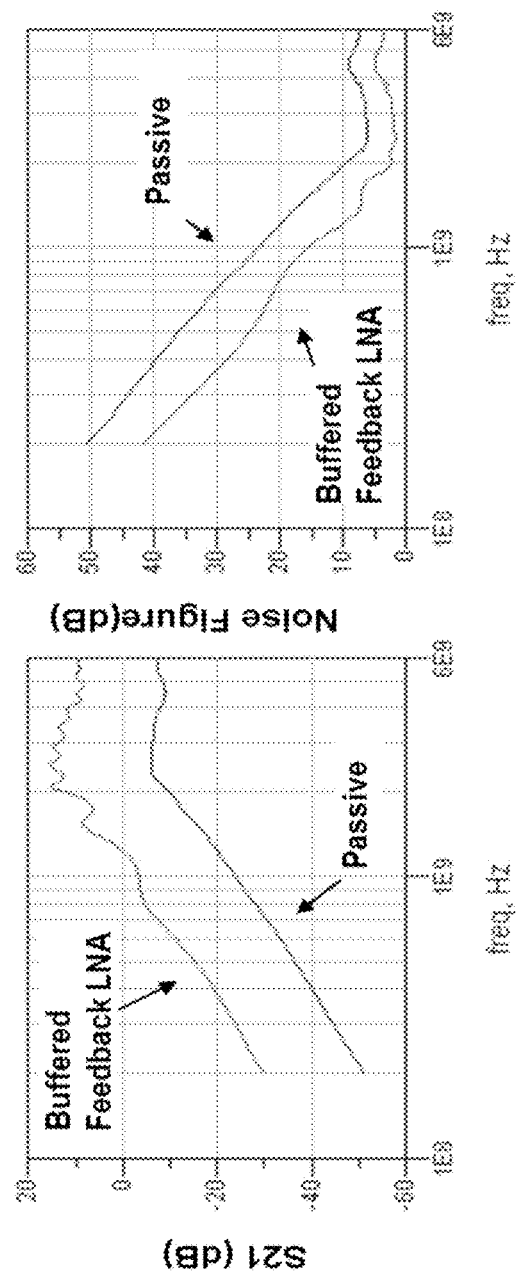
FIG. 5 depicts graphs of simulated comparisons of the active buffered sinuous (with resistive feedback) antenna with the passive sinuous antenna. S21 is the ratio of antenna gain (including any amplifier gain and the 5 dB loss of the attenuator) to the antenna directivity. The reference plane for the noise figure is the incident wave. Note: 1/f noise is not included in the model.

Turning to FIG. 5, the buffer amplifier 12 improves the gain by ~20 dB over the band relative to the passive antenna 11. The improvement in Noise Figure (NF) is approximately 10 dB over the extension band and 5 dB over the traditional band. Over the traditional band, this improvement is explained by the gain of the buffer amplifier, which swamps out the receiver noise figure. This is a textbook result and is not surprising. In the extension band, the increased benefit is explained by the fact that the T3 devices available from HRL Laboratories have excellent noise parameters. Specifically, the degradation in NF with impedance mismatch is determined by the noise parameters and noise circles. For this buffer, the minimum NF is <1 dB and the noise resistance is ~8 Ohms. This means that the impact of mismatch on the active NF is less than the impact on the passive antenna gain.

Figure 6:
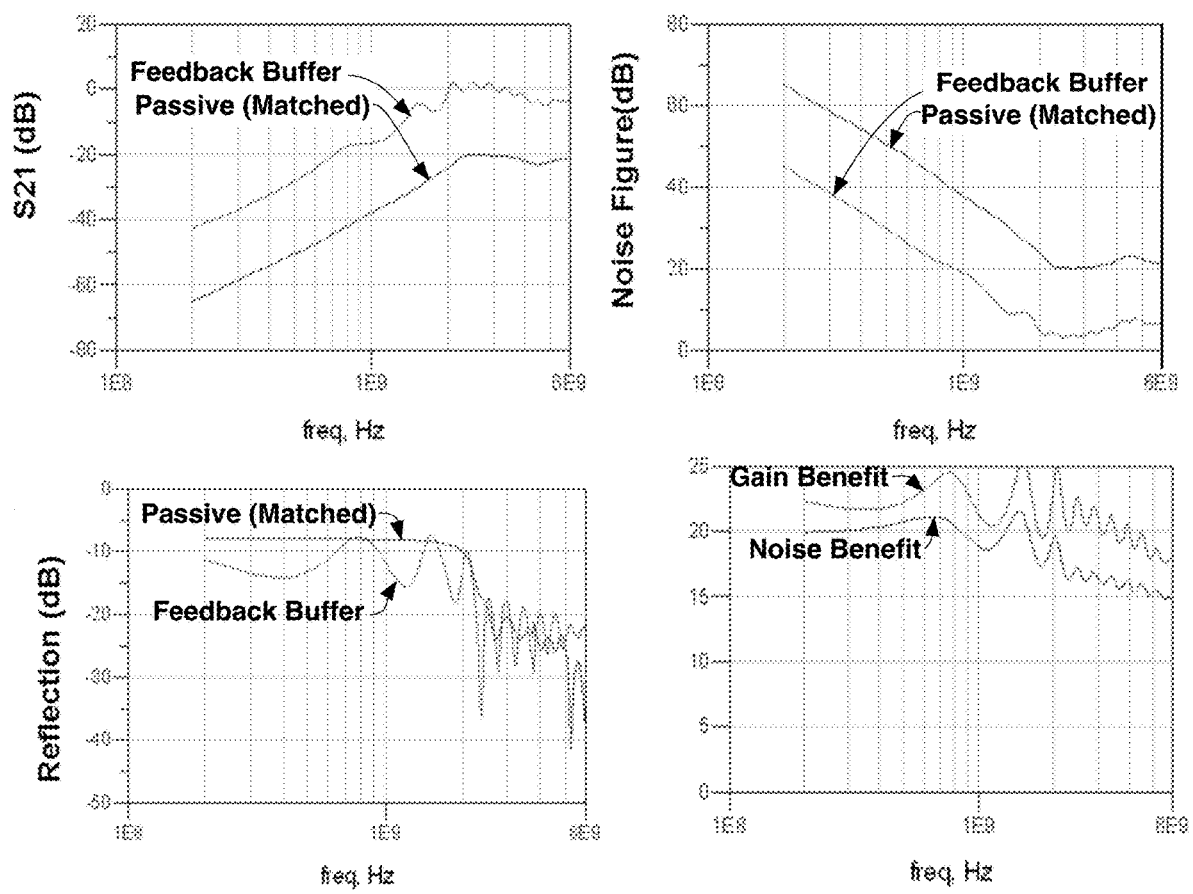
FIG. 6 depicts graphs of simulated performance when the outputs are matched to a −8 dB reflection coefficient specification using attenuators and the Receiver (RX) Noise Figure (NF) is 15 dB.

The comparison in FIG. 5 does not constrain the antenna 11 to be impedance matched to the system impedance Z0. This mismatch is unacceptable for many receivers. FIG. 6 shows a comparison when both the buffered and passive antennas were matched using attenuators, 3 and 4 dB, respectively, in order to achieve a −8 dB reflection coefficient over the entire band. In this figure, the receiver is modeled by a 15 dB attenuator. Due to the buffer gain, adding a 3 dB attenuator at the output has little impact on the NF. For the passive antenna, however, adding a 4 dB attenuator at its terminals degrades the NF by another 4 dB. Therefore, the buffer amplifier is advantageous by an additional 4 dB.

The disclosed embodiments permit a prior art passive cavity-backed antenna designed to operate in some traditional band of operation (where the size of the receive or transmit elements are each $>=\frac{1}{2}$ wavelength ($\lambda$) at the minimum frequency in that band) to operate over a much wider bandwidth that includes a low-frequency "extension band," where the size of the receive or transmit elements are $<=\frac{1}{2}$ wavelength ($\lambda$) at the minimum frequency that the antenna was otherwise designed to operate. A boundary frequency fc is defined as that frequency which defines a boundary between the "traditional band" of operation and the "extension band" of operation. The presently disclosed active antenna is a wideband antenna (preferably a cavity-backed sinuous antenna, but it also encompasses log-periodic and other type antennas having N arms, N feed terminals, and an array of N buffer amplifiers integrated directly into or at the feedpoint of the antenna, which permits an otherwise designed passive antenna to operate as an active antenna at lower frequencies than for which the passive antenna was designed.

The term band or frequency band when used herein is intended to refer to a frequency band having a nominal bandwidth where a rolloff at the edges of the band correspond to a point when the gain (or attenuation) has decreased by some amount, typically −3 dB, compared to a frequency center of the band. So the terms "traditional" band and "extension band" have gain rolloffs at the edges of those bands which are down by some amount, for example −3 dB, compared to a center frequency of those bands. The gain rolloffs occur where the gain at frequencies beyond the band edges continue to decrease from that amount (typically −3 dB).

Some passive antennas are multi-banded as they then have antenna elements of varying sizes (and/or mechanically variable sizes) and this are operable in several "traditional bands". The term "extension band" as used herein may be applied to any of the "traditional bands" with such multi-banded antennas.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ".

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. A wideband active antenna system comprising a passive antenna having N outputs, each of the N outputs being directly coupled to an associated buffer amplifier, with a physical distance between the N outputs and a first active stage of each associated buffer amplifier being maintained as short as reasonably possible, the wideband active antenna system having a greater nominal bandwidth than a nominal bandwidth of said passive antenna.

2. The wideband active antenna system of claim 1 wherein the antenna is a receive antenna selected from the group consisting of single and dual polarized cavity-backed sinuous antenna or log periodic antennas.

3. The wideband active antenna system of claim 2 wherein the first active stage of each associated buffer amplifier is disposed in one or more IC chips, said one or more IC chips being directly bonded to the outputs of said passive antenna, each associated buffer amplifier having a feedback circuit.

4. The wideband active antenna system of claim 3 wherein the passive antenna is configured to be impedance matched to an antenna system impedance Za at and above but not below a frequency fc which is a transition frequency between a relatively lower extension frequency band and a relatively higher traditional frequency band for which the passive antenna was designed to operate, where the passive antenna has a size which is greater than or equal to ½ a wavelength at the minimum frequency in the traditional frequency band and where the passive antenna has a size less than ½ a wavelength (λ) at the maximum frequency in the extension frequency band; and wherein each associated buffer amplifier is configured be impedance matched to Za both above and below frequency fc, the associated buffer amplifier output impedance is further configured to be matched to a system impedance Z0 both for input frequencies both above and below fc.

5. The wideband active antenna system of claim 3 wherein each associated buffer amplifier is coupled to an attenuator to provide an output impedance match with an receiver coupled to each attenuator.

6. The wideband active antenna system of claim 3 wherein each associated buffer amplifier is coupled to a signal combining network having at least a pair of outputs.

7. The wideband active antenna system of claim 6 wherein N=4 and wherein the at least a pair of outputs from the signal combining network provide horizontal and vertical polarized signals.

8. The wideband active antenna system of claim 1 wherein each associated buffer amplifier is embodied as one of a plurality of associated buffer amplifiers all of which are embodied in one or more integrated circuits, the one or more integrated circuits being directly coupled to the outputs of said passive antenna without any intervening RF transmission line between said one or more integrated circuits and the outputs of said passive antenna.

9. The wideband active antenna system of claim 1 wherein said one or more integrated circuits are embodied in a single IC chip, said single IC chip being directly bonded to said outputs on said passive antenna.

10. The wideband active antenna system of claim 1 wherein each associated buffer amplifier is embodied as one of a plurality of associated buffer amplifiers each of which is implemented in a separate integrated circuit.

11. The wideband active antenna system of claim 1 wherein said physical distance is no greater than ¼ wavelength of any transmission and/or receiving frequency of the wideband active antenna system.

12. The wideband active antenna system of claim 1 wherein said physical distance is no greater than 0.1 wavelength of any transmission and/or receiving frequency in an extension band of frequencies lower than the lowest frequency in a nominal bandwidth of the antenna.

13. An wideband active antenna system comprising an antenna having a plurality of arms, each of the arms being directly coupled to an associated buffer amplifier embodied in one or more integrated circuit chips mounted directly on or to the arms of the antenna.

14. The wideband active antenna system of claim 13 wherein the antenna is a receive antenna selected from the group consisting of single and dual polarized cavity-backed sinuous antenna and log periodic antennas.

15. The wideband active antenna system of claim 14 wherein each associated buffer amplifier has a feedback circuit.

16. The wideband active antenna system of claim 15 wherein the antenna is configured to be impedance matched to an antenna impedance Za at and above but not below a frequency fc; and wherein each associated buffer amplifier is configured to present a high impedance at frequencies substantially <fc, the associated buffer amplifier output impedance is further configured to be matched to a system impedance Z0 both above and below fc.

17. The wideband active antenna system of claim 15 wherein each associated buffer amplifier is coupled to an attenuator to provide an output impedance match with a receiver coupled to each attenuator.

18. The wideband active antenna system of claim 15 wherein each associated buffer amplifier is coupled to a signal combining network having at least a pair of outputs.

19. The wideband active antenna system of claim 18 wherein N=4 and wherein the at least a pair of outputs from the signal combining network provide horizontal and vertical polarized signals.

20. The wideband active antenna system of claim 13 wherein each associated buffer amplifier is embodied as one of a plurality of associated buffer amplifiers all of which are implemented in a single integrated circuit.

21. The wideband active antenna system of claim 13 wherein each associated buffer amplifier is embodied as one of a plurality of associated buffer amplifiers each of which is implemented in a separate integrated circuit.

22. A method of extending a useful frequency range of a passive antenna, the antenna having a plurality of arms which extend away from a central location, the method including
  providing one of more chips with a plurality of buffer amplifiers embodied therein, each buffer amplifier having a signal input terminal,
  disposing the one or more chips at or immediately adjacent said central location and arranging a layout of the buffer amplifiers embodied in said one or more chips so that (i) the signal input terminal of each buffer amplifier in said one or more chips is disposed immediately adjacent a proximate end of an associated one of said plurality of arms when said one or more chips are disposed at or immediately adjacent said central location and (ii) the signal input terminal of each buffer amplifier in said one or more chips is disposed immediately adjacent a control element of an active device of an associated one of said buffer amplifiers.

23. The method of claim 22 wherein the active device is a GaN FET and the control element is a gate of said GaN FET.

24. An apparatus for extending a useful frequency range of an otherwise passive antenna, the antenna having a plurality of arms which extend away from a central location, the apparatus including:
at least one chip with at least one buffer amplifier embodied therein, each buffer amplifier having a signal input terminal,
the at least one chip being disposed at or immediately adjacent said central location, and
the at least one chip having a layout of the at least one buffer amplifier embodied in said chip wherein (i) the signal input terminal of the at least one buffer amplifier in said at least one chip is disposed immediately adjacent a proximate end of an associated one of said plurality of arms of said antenna when said at least one chip is disposed at or immediately adjacent said central location and (ii) the signal input terminal of each buffer amplifier in said at least one chip is disposed immediately adjacent a control element of an active device of an associated one of said at least one buffer amplifier.

25. The apparatus of claim 24 wherein the active device is a GaN FET and the control element is a gate of said GaN FET.

26. The apparatus of claim 25 wherein each GaN FET has a current carrying electrode coupled to a ground connection, said ground connection being isolated from said passive antenna.

27. The apparatus of claim 24 wherein a physical distance between the proximate end of each arm of the antenna and a first active stage of each associated buffer amplifier is as short as reasonably possible and no greater than ¼ wavelength of any transmission and/or receiving frequency of the apparatus.

28. The apparatus of claim 24 wherein a physical distance between the proximate end of each arm of the antenna and a first active stage of each associated buffer amplifier is as short as reasonably possible and no greater than 0.1 wavelength of any transmission and/or receiving frequency in an extension band of the apparatus, the extension band including frequencies lower than a lowest frequency in a nominal bandwidth of the antenna.

* * * * *